(12) United States Patent
Hillberry et al.

(10) Patent No.: US 6,890,137 B2
(45) Date of Patent: May 10, 2005

(54) AMBULANCE STRETCHER SUPPORT TO REDUCE PATIENT TRAUMA

(76) Inventors: Dee J. Hillberry, P.O. Box 210, Thermopolis, WY (US) 82443; Mark C. Mortimore, 624 Arapahoe, Thermopolis, WY (US) 82443

( * ) Notice: Subject to any disclaimer, the term of this patent is extended or adjusted under 35 U.S.C. 154(b) by 0 days.

(21) Appl. No.: 10/607,113

(22) Filed: Jun. 25, 2003

(65) Prior Publication Data

US 2004/0265084 A1 Dec. 30, 2004

(51) Int. Cl.[7] .................................................. B60P 7/08
(52) U.S. Cl. ............................ 410/30; 410/19; 410/66; 410/86; 410/87; 296/20; 267/150; 267/259
(58) Field of Search .............................. 410/7, 16, 19, 410/30, 66–67, 77, 80, 86–88, 90; 296/19, 20; 267/33, 150, 259; 188/32; 5/104, 118, 210; 248/346.04, 346.11

(56) References Cited

U.S. PATENT DOCUMENTS

| | | | |
|---|---|---|---|
| 42,152 A | 4/1864 | Arnold | |
| 48,404 A | 6/1865 | Howard | |
| 398,517 A | 2/1889 | Lawrence | |
| 546,855 A | 9/1895 | Hutchinson | |
| 1,221,225 A | * 4/1917 | Schauermann | 248/346.11 |
| 1,517,069 A | 11/1924 | Huddart | |
| 2,324,685 A | 7/1943 | Ekman et al. | |
| 2,558,056 A | 5/1951 | Mitchell | |
| 3,752,526 A | 8/1973 | Van Der Burgt | |
| 3,918,554 A | * 11/1975 | Bourgraf et al. | 188/32 |
| 4,804,302 A | * 2/1989 | Andre | 410/19 |
| 4,923,346 A | * 5/1990 | Hager | 410/19 |
| 5,046,587 A | * 9/1991 | Jones | 188/32 |
| 5,092,722 A | * 3/1992 | Reazer et al. | 410/104 |
| 5,205,601 A | * 4/1993 | Ferris | 296/20 |
| 5,388,937 A | * 2/1995 | Farsai | 410/9 |
| 5,913,559 A | * 6/1999 | Sexton et al. | 296/20 |
| 6,524,040 B1 | * 2/2003 | Heil | 410/67 |
| 6,527,263 B1 | 3/2003 | Verbrugge | |
| 6,659,696 B2 | * 12/2003 | Hoffnung | 410/66 |

FOREIGN PATENT DOCUMENTS

GB 763860 12/1956

* cited by examiner

Primary Examiner—Stephen Gordon
(74) Attorney, Agent, or Firm—John S. Reid; James Price (57) ABSTRACT

An ambulance stretcher support is described for an ambulance having a floor with a top floor surface. In one embodiment, each support includes a stretcher leg receiving member that is adapted to releasably receive an ambulance stretcher leg. A base, configured to be mounted to the ambulance floor, mounts the stretcher leg receiving member for movement between a position substantially coplanar with the top floor surface, and a position below the top floor surface. A vibration reduction device is mounted between the base and the stretcher leg receiving member such that the stretcher leg can be releasably supported on the stretcher leg receiving member and the vibration reduction device will reduce transfer of vibration from the ambulance floor to the stretcher.

12 Claims, 5 Drawing Sheets

AMBULANCE STRETCHER SUPPORT TO REDUCE PATIENT TRAUMA

FIELD OF THE INVENTION

The invention claimed and disclosed herein pertains in general to supporting patient stretchers, and more specifically to supporting a stretcher and patient in an ambulance to reduce patient trauma from vibration of the ambulance while in transit.

BACKGROUND

Patient transport by ambulance can result in shock or vibration induced trauma due to road conditions encountered by the ambulance when in transit. Of course a degree of ride roughness may be taken into account by the ambulance suspension. However, an ambulance suspension has yet to be developed that is sufficiently compliant for comfort but also allows for safe vehicle operation. A need is thus recognized for some form of compliant patient support within an ambulance that will allow use of normal vehicle suspension and yet reduce potential ride induced trauma to the patient.

Various patient and stretcher suspension devices have been developed in recognition of the above problem. However most are costly, complex, and do not adapt well to standardized ambulance lock down arrangements by which the otherwise movable stretchers are secured within the ambulance.

Another problem faced by those wishing to supplement ambulance suspension systems to improve patient comfort is that there is no standard configuration for ambulance stretchers. In fact, there are several stretcher configurations currently available in the marketplace. Stretcher configuration and weight may vary, as may lock down arrangements to accommodate the various cot structures. Such variations increase the difficulty in designing a simple universal vibration damping system.

One fairly standard ambulance feature is floor construction. An ambulance floor typically includes a floor covering placed over a sheet of plywood that is used as a subfloor. The plywood is placed over a metal pan that is an integral part of, or is mounted to the ambulance chassis. The pan protects and seals the plywood from exposure to the outside environment and the plywood provides rigidity, working with the floor covering to provide a degree of sound and heat insulation for the ambulance interior. The combination of covering and plywood presents a floor thickness between the covering and pan that is typically less than about one inch. The thin floor structure limits use of subfloor mounted vibration reduction mechanisms, at least if it is desired to maintain the integrity of the pan. Floor mounted vibration reduction systems have been mounted above the floor surfaces to maintain the integrity of the pan. However, such structures may obstruct access and hinder cleaning.

In view of the above problems, what is needed is a vibration reduction arrangement which achieves the benefits to be derived from other, known methods and devices, but which avoids the shortcomings and detriments individually associated therewith.

SUMMARY

In one embodiment of our invention, an ambulance stretcher support is provided for an ambulance having a floor with a top floor surface, and includes a stretcher leg receiving member, a base, and a vibration reduction device. The stretcher leg receiving member is adapted to releasably receive an ambulance stretcher leg. The base is configured to be mounted to the ambulance floor and to mount the stretcher leg receiving member for movement between a position substantially coplanar with the top floor surface of the ambulance, and a position below the top floor surface. The vibration reduction device is mounted between the base and the stretcher leg receiving member so that a stretcher leg can be releasably supported on the stretcher leg receiving member and the vibration reduction device will reduce transfer of vibration from the ambulance floor to the ambulance stretcher.

Another aspect of the invention is provided in combination with an ambulance floor having a top surface and a bottom pan, with the apparatus for releasably and yieldably receiving an ambulance stretcher leg. The apparatus includes a stretcher leg receiving member, a base mounted to the ambulance floor and extending toward the bottom pan from the floor top surface, and a vibration reduction device mounted between the base and the stretcher leg receiving member. The vibration reduction device yieldably and resiliently supports the stretcher leg receiving member adjacent to and substantially coplanar with the top surface of the floor. The vibration reduction device is configured to yieldably deflect under weight of a stretcher leg received on the stretcher leg receiving member.

A still further aspect includes an ambulance floor mounted vibration damping system for releasably supporting a stretcher having a plurality of legs, and for reducing transfer of vibration from the ambulance floor to the stretcher. In this aspect, a stretcher leg receiving member is provided for each leg of the stretcher, along with a base for each stretcher leg receiving member. The bases are adapted to be mounted to the ambulance floor in position beneath the stretcher legs. Also, a vibration reduction device is mounted between each base and an associated stretcher leg receiving member, yieldably and resiliently supporting the stretcher leg receiving member adjacent the ambulance floor, to yieldably deflect under weight of a stretcher leg received on the stretcher leg receiving member.

A further aspect includes a process for reducing transmission of vibration from an ambulance floor to the legs of a stretcher. The process includes embedding a base within an ambulance floor with a bottom surface situated below a top surface of the ambulance floor. The process also includes placing a vibration reduction device on the bottom surface, and placing a stretcher leg receiving member over the vibration reduction device, with a top surface of the stretcher leg receiving member substantially coplanar with the top surface of the ambulance floor. A stretcher is positioned on the ambulance floor with a leg thereof resting on the stretcher leg receiving member whereby transmission of vibration of the ambulance floor to the stretcher is reduced The above and still further aspects and embodiments of the present invention will be described in detail following a brief description of the various drawing figures provided herewith.

DETAILED DESCRIPTION

Figure 1:
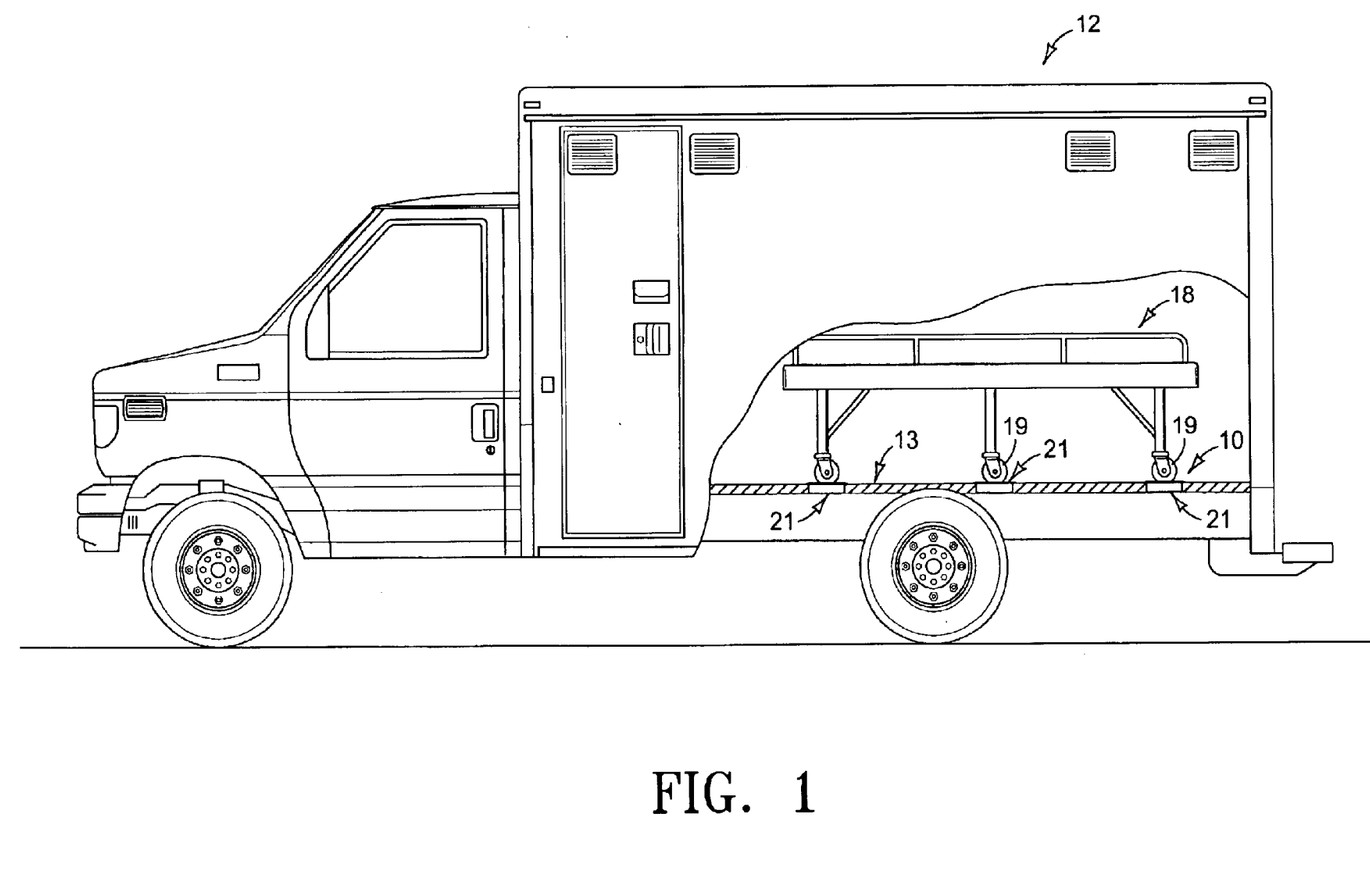
FIG. 1 is a side elevation view of an ambulance incorporating one form of a stretcher support in accordance with the present invention.

Referring now in greater detail to the drawings, attention is first directed to the ambulance shown generally in FIG. 1. The illustrated ambulance 12 is shown with exemplary forms of the present ambulance stretcher support, which are generally identified by the reference numeral 10. A side wall portion of the ambulance 12 is shown broken away to expose a portion of the ambulance floor 13 which incorporates the supports 10. A stretcher 18 is shown within the ambulance 12, with leg and wheel assemblies 19 resting on the stretcher supports 10.

It is pointed out that the present supports 10 can be provided in a system combined with an ambulance floor 13, for placement in an ambulance in such a manner to receive and support each leg and wheel assembly 19 of a stretcher. The supports function to diminish transmission of vibrations from the ambulance floor to the stretcher and thereby reduce trauma or discomfort for a patient resting on the stretcher 18. It is further noted that individual ones of the supports 10 can be provided and mounted to an existing ambulance floor. It is also possible for the supports 10 to be incorporated as an integral part of an ambulance during manufacture of the ambulance 12.

Figure 7:
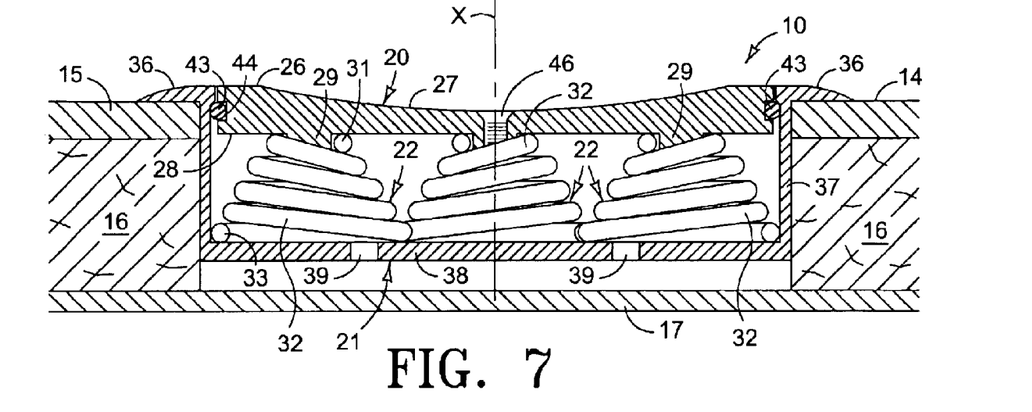
FIG. 7 is a partial sectional view taken through an exemplary base, stretcher leg receiving member, and vibration reduction device in which three exemplary springs are shown for clarity.
Figure 8:
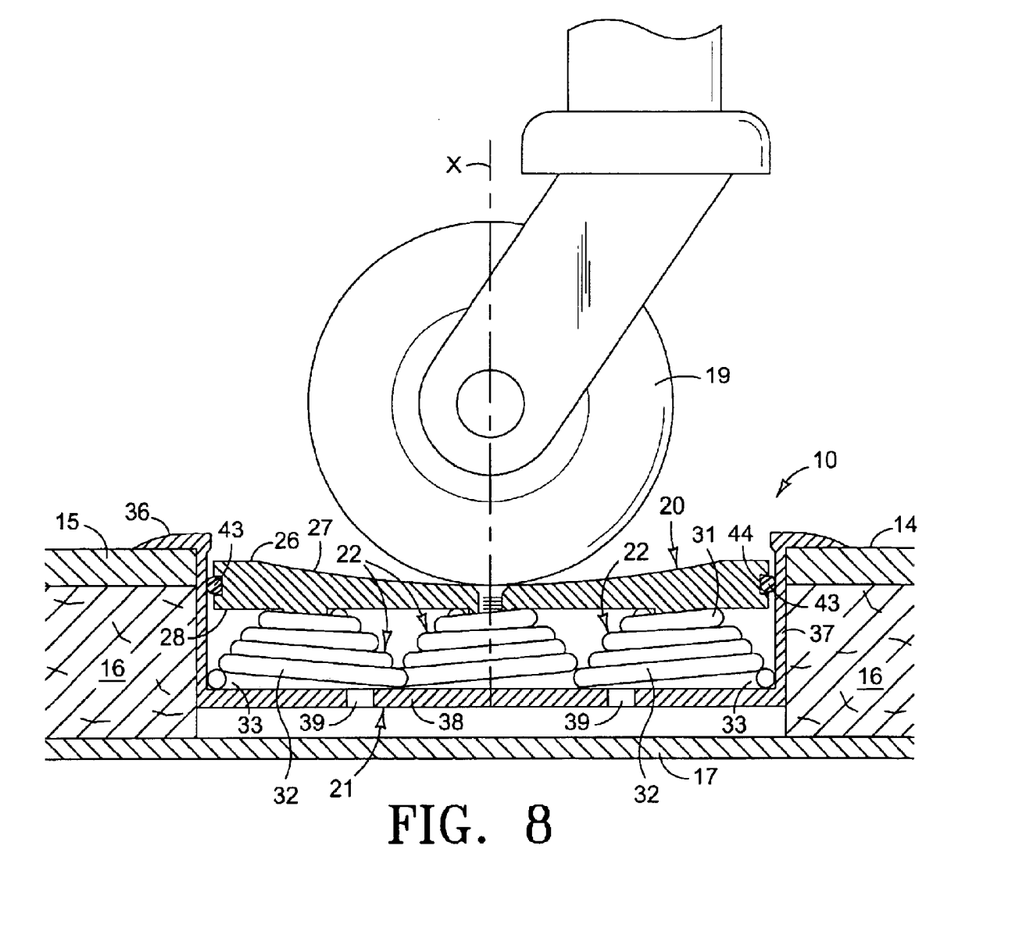
FIG. 8 is a view similar to FIG. 7 with a fragmentary showing of a stretcher leg and wheel bearing downwardly against the stretcher leg receiving member, and deflecting the vibration reduction device.

Portions of an exemplary ambulance floor 13 are shown generally in FIG. 1, and in greater detail by FIGS. 7 and 8. There the floor 13 is shown to include a top surface 14 defined by a floor covering 15 that is supported on a subfloor 16 which is typically formed of plywood. In many instances, the plywood will have a thickness dimension of about ¾ inch. The floor covering thickness can vary according to the material used, but is usually within a range of about 1/16–¼ inch. Thus the overall floor thickness (excluding the thickness dimension of the pan 17) can vary somewhat, but will generally be approximately 13/16–1 inches.

The ambulance subfloor 16 is typically supported by a bottom pan 17 that is mounted to or is an integral part of the ambulance chassis. The pan 17 is usually formed of aluminum or another rigid material and is substantially imperforate to protect the patient compartment. It is intended that the present supports 10 be provided between the floor 13 and stretcher 18 without involving penetration or alteration of the pan 17 and without projecting significantly above the top floor surface 14.

Figure 2:
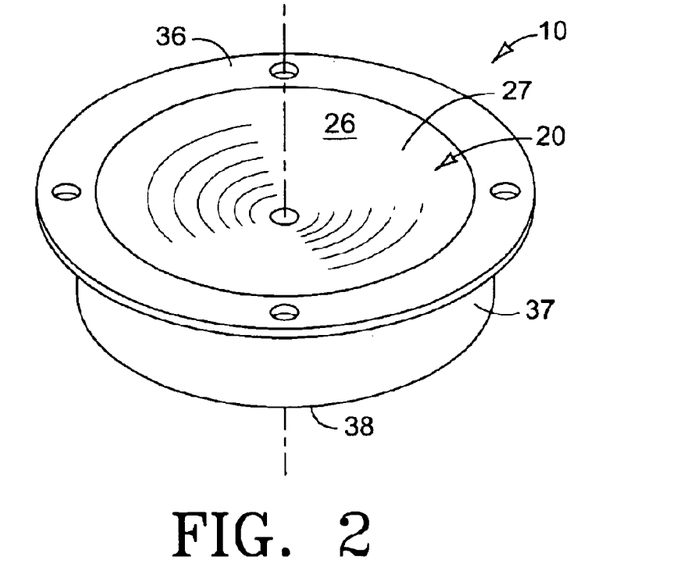
FIG. 2 is a pictorial view depicting a single stretcher support.

It is noted that the support 10 is shown in FIG. 2 as circular in form, including the stretcher leg receiving member 20 and base 21. However other shapes can be used, including other curvilinear or polygonal shapes. The illustrated circular configuration is useful to enable use of a conventional hole saw 50 (FIG. 9) for installation of the base 21, and to permit use of a conventional rubber or synthetic "O" ring 43 between the member 20 and base 21.

The stretcher leg receiving member 20 depicted in FIG. 7 is formed as a rigid plate of an appropriate material such as aluminum, which can be anodized for surface hardening and to avoid corrosion. The stretcher leg receiving member 20 is defined by a top surface 26 which, as depicted, has a concave stretcher leg or wheel receiving and centering surface 27 formed therein. The concave surface 27 can be substantially centered on a central axis "X" passing through the member 20 and about which the remaining components of the support are positioned. Thus formed, the surface 27 will function to center and releasably position a stretcher leg and wheel 19 with respect to the base 21 and vibration reduction device 22, substantially as shown in FIG. 8.

In the example illustrated, the concave surface 27 is of a substantially constant radius (i.e., "spherical"). However, conical, pyramidal, as well as other concave surface shapes, can function as well. The selected concave shape can be located to reach its lowest point at or very near the axis X, so a wheel and stretcher leg will naturally tend to center on the axis, and so the weight resistance offered by the vibration reduction device 22 can be evenly applied.

The member 20, as depicted, also includes a bottom 28 with downwardly projecting bosses 29 that are used to position and spatially locate the vibration reduction device 22. In the illustrated embodiment, seven bosses 29 are provided with one centrally located and the remainder substantially equiangularly spaced about the central axis X. The bosses 29 can be integral with the remainder of the member 20. However, the bosses 29 can also be separately formed and then mechanically, adhesively or otherwise attached to the member 20.

It is also noted that although the bosses 29 depicted in FIG. 8 are part of the member 20, the base 21 can alternately be provided with similar bosses for the same purpose, with or without bosses 29 on the member 20. As a further alternative, another form of positioning arrangement can be provided on the vibration reduction device 22 for substantially centering the device with respect to the stretcher leg receiving member 20.

As shown in FIGS. 7 and 8, the rim or peripheral edge of the stretcher leg receiving member 20 is provided with a peripheral groove 44 or like arrangement by which the "O" ring 43 can be mounted. The illustrated groove 44 is sized to locate the "O" ring 43 in engagement with adjacent wall 37 of the base 21. The "O" ring 43 can be of a conventional form to provide a sliding but resilient seal between the member 20 and the base 21. Rubber or an appropriate synthetic"O" ring material can be used, which includes resilient properties. The preferred "O" ring material will deflect to conform with the shape of the adjacent base surfaces, and will movably seal against the base 21 to prevent liquids or debris from falling into the base.

Another feature of the stretcher leg receiving member 20 is a normally plugged lift hole 46, provided to allow for attachment of a lift tool 47 (FIG. 9) which can be used for placing and removing the member 20 into and from the base 21. An appropriate plug or screw can be used to normally close the hole 46, to be removed when it is desired to engage the tool 47 in the hole 46 to enable removal of the member 20 for access to the contents of the base 21.

Figure 9:
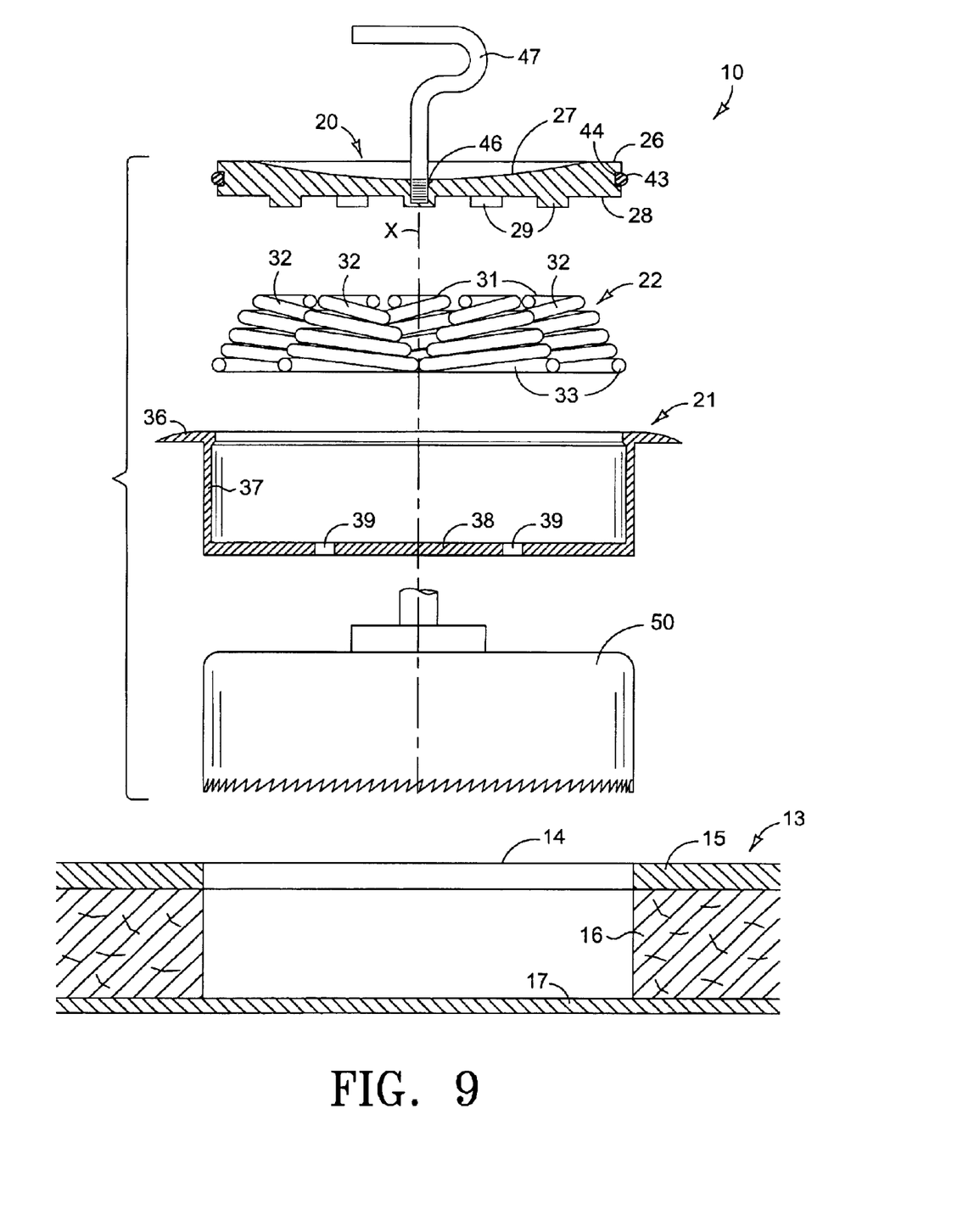
FIG. 9 is an exploded view depicting elements in a separated arrangement, and indicating steps in a process for reducing vibration between the ambulance floor and the stretcher.

Referring now in greater detail to the base 21, attention is drawn to FIG. 9 where the base is shown Without the member 20 and vibration reduction device 22. The base 21 can be formed of the same material, such as anodized aluminum, as the stretcher leg receiving member 20, and can be produced using conventional milling, casting or other known manufacturing techniques.

The base 21 includes a flange 36 that will allow secure mounting to an ambulance floor. The flange 36 is also provided with a beveled outward edge that will smoothly transition with the top surface of the floor and allow a stretcher wheel to roll freely onto the adjacent leg receiving member 20. It is useful when the units are installed, that no more than the flange thickness project above the ambulance floor (see FIGS. 7,8) in order to minimize obstruction of the stretcher wheels. This low profile also serves to avoid any significant change in the "at rest" position of the stretcher, so no change or modification of the stretcher lock down equipment (not shown) will become necessary.

Figure 3:
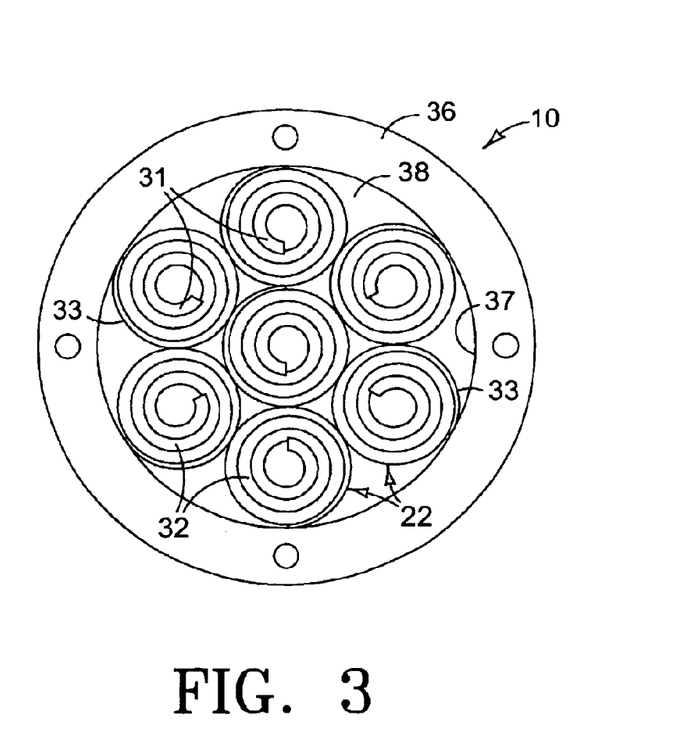
FIG. 3 is a top plan view of the stretcher support with the stretcher leg receiving member removed to show a vibration reduction device adjusted for a high degree of resistance to deflection.

The exemplified flange 36 can be provided at the top end of the base wall 37. The base wall is depicted as circular, and extends axially downward from the flange 36 as illustrated in FIG. 3 and others to form a vibration reduction device receiving chamber. The wall 37 can be formed in a shape that is complimentary to the stretcher leg receiving member 20, so the member 20 is allowed to slide substantially linearly within the wall confines. The axial dimension of the wall 37 (between the bottom surface of the flange 36 and the bottom end of the wall) will typically be no greater than about one inch.

The above thickness dimension is made to approximate the minimum anticipated thickness dimension of a conventional ambulance floor including the floor covering and the subfloor, but not including the pan thickness dimension. Since ambulance floor and subfloor thickness dimensions vary, the base 21 can be manufactured accordingly. Typically, the axial wall dimension will not be greater than the minimum ambulance subfloor and floor covering thickness dimension. This allows for flush mounting of base flange 36 with the floor covering top surface 14, while also providing for axial travel of the stretcher leg receiving member 20 in response to weight applied through a stretcher 18. The axial base dimension further allows for mounting of the apparatus without requiring that the pan 17 be penetrated or otherwise altered for installation.

Versions of the base used in retrofit situations can include a bottom wall surface 38, spanning the wall 37. In such embodiments, breather holes 39 can be provided to minimize air pressure fluctuations within the chamber. The surface 38 is used in these embodiments to help contain the vibration reduction device. It is noted, however, that the depicted surface 38 can be eliminated in situations where the supports are incorporated as an integral part of an ambulance. In such instances the pan 17 can become the bottom surface.

Aspects of the vibration reduction device will now be discussed. In general terms, the vibration reduction device 22 is provided between the base and the stretcher leg receiving member 20 such that a stretcher leg and wheel 19 can be releasably supported on the stretcher leg receiving member 20 and the vibration reduction device will reduce transfer of vibration from the ambulance floor to the ambulance stretcher.

Various known pneumatic, hydraulic, or mechanical devices can be used along with the support 20 and base 21 to achieve the desired vibration damping result within the scope of our invention. However, it is useful to use springs, and more specifically, a plurality of conical coil springs 32 formed of conventional spring material, having top ends 31 of reduced diameter with respect to enlarged bottom ends 33. Multiple springs 32 of the nature exemplified herein give the advantage of simplicity, adjustability, low cost, and uniform resistance against forces applied downwardly against the leg receiving member (by the stretcher), and upwardly by vibrations of the ambulance floor. Small lateral vibrations can also be reduced as accommodated by the springs and inherent resiliency of the "O" ring 43.

The illustrated spring tops 31 can be shaped to receive the bosses 29 on member 20. This is a desirable arrangement by which the springs can be evenly and equiangularly placed about the central axis "X", thereby providing for uniform resistance against axial movement of the member 20. It is pointed out, however, that other arrangements can be made for orienting the springs that are not shown but that fall within the definition of the invention set forth in the claims following the present specification.

It is also pointed out that the spring travel is typically limited to an axial distance of less than 0.75 inches. The low profile and short spring travel permit use of the present supports without presenting significant obstruction to the stretcher wheels. Further, short spring travel is desirable because it permits reduction of vibration without requiring alteration or replacement of standard stretcher lock down mechanisms. The stretcher can be mounted to the supports and the existing lock down mechanisms can be attached in the same manner as they would be if the supports were not being used.

FIG. 3 depicts seven springs 32 in use within the base 21. Although seven individual springs 32 are illustrated, it should be understood that greater numbers can be used. In fact, an arrangement of up to nine springs can be used in situations where greater spring resistance is desired or where larger diameter stretcher leg receiving members 20 need to be used to accommodate stretchers having large wheels. Fewer springs 32 can also be used, with different spacing arrangements. Typically, however, a minimum of three, and a maximum number of nine springs 32 will be used, with the most common maximum number being seven springs, as shown.

It is further pointed out that the springs can be mounted to the base 21, the stretcher leg receiving member 20, or be independent as depicted. In the illustrated embodiment, the springs are relatively independent, being confined only by the bosses 29.

Figure 4:
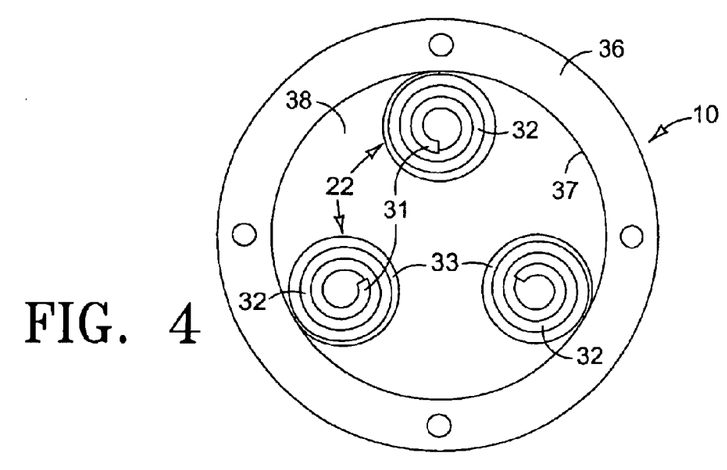
FIG. 4 is a top plan view depicting another exemplary arrangement for the vibration reduction for a lesser degree of resistance.
Figure 5:
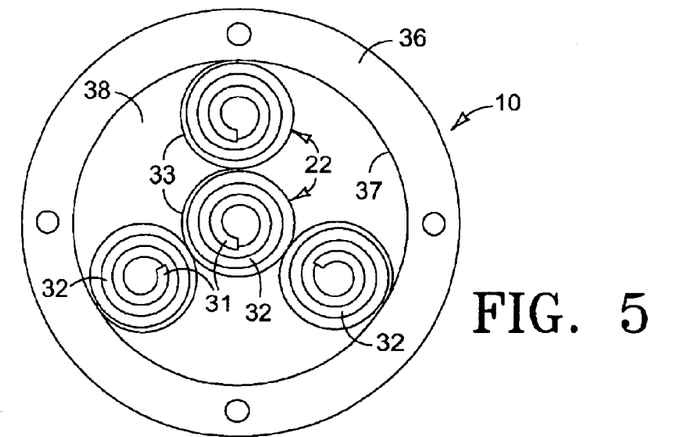
FIG. 5 is a top plan view depicting another exemplary arrangement for the vibration reduction device.
Figure 6:
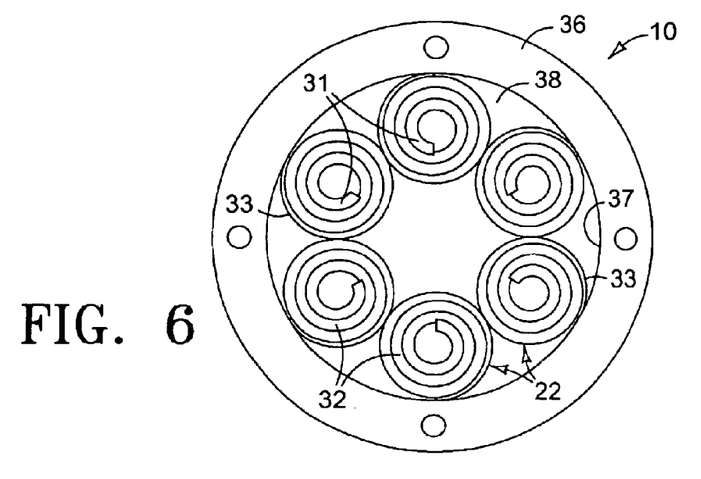
FIG. 6 depicts another exemplary arrangement used to produce a still further different degree of resistance.

FIGS. 4–6 are included to depict arrangements of springs 32 used to vary the amount of resistance offered to movement of the member 20 toward the base bottom 38. Such adjustment capability is desirable to accommodate patient weight distribution on the stretcher 18. For example, weight concentration under a prone patient will vary, with more weight concentrated at the torso area than at the head or feet. Adjustments of spring numbers below these areas can be made to accommodate the different weight concentrations. For example, the bases 21 that are located under the torso area of a patient can have the maximum number of springs while those bases 21 situated below the head and feet areas can have fewer springs.

Adjustment of spring numbers can also be made in instances where transport conditions are known. For example, more springs might be used in an ambulance dedicated to a professional football stadium because the potential patients are likely to be heavier than those found in ordinary public places. Known road conditions can influence spring adjustment as well. For example, fewer springs can be used for a well maintained paved road than what might be useful in a rural area on an unpaved "washboard" road.

FIGS. 4, 7, and 8 depict an equiangularly spaced group of three springs 32, an arrangement used to minimize resistance to deflection. FIGS. 5 and 6 depict example arrangements for progressively increasing resistance by using more springs 32. The illustrated exemplary springs are also in equiangular relationships with respect to the central axis "X". Of course the heaviest resistance is offered by the maximum number of springs 32 (assuming the same spring constant is used for additional springs) that will fit into the base 21 (FIG. 3), which in the example illustrated is seven. The groupings shown are offered simply as examples for spring grouping based upon an initial seven spring unit. Similar arrangements of springs in groups including up to nine springs can be made.

It has been found by experimentation that slight unequal angular spacing of springs about the center axis "X" is tolerable, so long as the member 20 does not deflect and bind from asymmetrical loading. For example, two of the springs (the center spring and one of the remaining springs) have been removed from the symmetrical arrangement shown in FIG. 3, leaving an asymmetrical angular spacing of five springs. It was found that such an arrangement did not result in a noticeable imbalance in resistance or binding of the stretcher leg receiving member 20.

The present process for reducing transmission of vibration from an ambulance floor to the legs of a stretcher includes embedding the bases 21 in the ambulance floor. This can be done by first forming holes in the floor to a depth that is equal to or slightly greater than the thickness dimension of the bases 21 (as measured from the bottom surface of the flange 36 to the bottom end of the wall 37). This can be accomplished using a conventional hole saw 50 (FIG. 9). As earlier indicated, the hole depth and the axial thickness dimension of the bases 21 is typically selected to be at most equal to the thickness of the floor 13 between the top surface 14 and the pan 17.

In the process, a base 21 is inserted into each of the formed holes with the flanges 36 coming into flush contact with the top surface 14 of the floor. Standard fastening arrangements such as screws, bolts, adhesives or other fastening arrangements can be used to secure the bases in position. Alternatively, the hole size can be selected to provide a resistance fit so mechanical or other fastening means is not required.

The process also includes placing a vibration reduction device 22 on a bottom surface 38 of the base 21, and placing a stretcher leg receiving member 20 over the vibration reduction device 22, with a top surface 26 of the stretcher leg receiving member 20 substantially coplanar with the top surface 14 of the ambulance floor. These steps can be accomplished using the conical compression springs 32 by selecting the desired number of springs, placing them in engagement over selected bosses 29 on the member 20, then inserting the assembled grouping into the base 21. The springs 32 are constructed to normally support the member 20 with the top surface 26 substantially coplanar with the top floor surface 14. It is pointed out that the term "substantially coplanar" is meant to include the condition illustrated in FIG. 7 where the top surface 26 is just slightly elevated above the top floor surface 14 when the support 10 is installed.

The above steps are repeated for each one of the stretcher legs, in a pattern on the ambulance floor, matching the spacing of the stretcher legs so each leg can be received by and rest against the top surface 26 of a stretcher leg receiving member 20, as exemplified in FIG. 1.

The process can further include positioning a stretcher on the ambulance floor with legs thereof resting on the stretcher leg receiving members, so transmission of vibration of the ambulance floor to the stretcher is reduced, thereby also reducing vibration induced patient trauma. All legs of the stretcher can be supported in this manner so that vibration in the ambulance floor is transmitted to the springs which function to reduce and dampen the motion which would otherwise be transmitted to the stretcher.

The installed supports 10 can have their floor flanges 36 and members 20 substantially flush with the ambulance floor as shown in FIG. 7, and in position to receive all the floor engaging legs or wheels on the associated stretcher. However, when a stretcher is rolled into place and locked down, with the stretcher legs engaging the supports 10, the stretcher and patient weight will deflect the members 20 as suggested in FIG. 8. During such deflection, the members 20 will slide downwardly in their associated bases 21 while the "O" rings 43 maintain resilient yet sealed relationships with the bases 21. Any air that would otherwise be compressed within the bases by this action is expelled through the air drain holes 39. Also, the concave surfaces 27 on the members 20 function during this time to center the applied weight over the respective groups of springs.

As the springs 32 compress, their windings will nest together, allowing for maximum spring travel in the minimal space allowed. Of course the amount of deflection will depend upon the weight bearing down from the stretcher and patient.

Once the stretcher is received by the supports 10, transmission of floor vibration to the stretcher and patient will be reduced by the springs 32. Such vibration reduction will correspondingly reduce vibration induced trauma in the patient riding on the stretcher.

All the time the stretcher is in place, with or without a patient, the relatively small amount of spring travel, will assure that the conventional stretcher lock down mechanisms (not shown) will function normally. Thus, no alteration of the lock down mechanism is required.

Should the attendant wish to make adjustments in spring resistance, or to simply gain access to the springs for other purposes, he or she may simply remove the plug from the desired member 20, and attach the tool 47. An upward force applied through the tool 47 will cause the engaged member to slide upwardly free of the base 21 and allow free access to the springs 32 inside. Once the desired adjustment is made, replacement of the member 20 is accomplished as a simple matter of reversing the above steps.

While the above invention has been described in language more or less specific as to structural and methodical features, it is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. An ambulance stretcher support for an ambulance having a floor with a top floor surface, comprising:
   a stretcher leg receiving member including a concave stretcher wheel receiving surface adapted to releasably receive an ambulance stretcher leg;

a base configured to be mounted to the ambulance floor and to mount the stretcher leg receiving member for movement between a position substantially coplanar with the top floor surface, and a position below the top floor surface;

a vibration reduction device mounted between the base and the stretcher leg receiving member; and wherein a stretcher leg can be releasably supported on the stretcher leg receiving member and the vibration reduction device will reduce transfer of vibration from the ambulance floor to the ambulance stretcher.

2. The ambulance stretcher support of claim 1, wherein the vibration reduction device is comprised of at least three coil springs mounted between the stretcher leg receiving member and the base.

3. An ambulance stretcher support for an ambulance having a floor with a too floor surface, comprising:

a stretcher leg receiving member adapted to releasably receive an ambulance stretcher leg:

a base configured to be mounted to the ambulance floor and to mount the stretcher leg receiving member for movement between a position substantially coplanar with the top floor surface, and a position below the top floor surface;

a vibration reduction device mounted between the base and the stretcher leg receiving member;

wherein the vibration reduction device is comprised of at least three coil springs mounted between the stretcher leg receiving member and the base;

wherein the coil springs are conical compression springs; and wherein a stretcher leg can be releasably supported on the stretcher leg receiving member and the vibration reduction device will reduce transfer of vibration from the ambulance floor to the ambulance stretcher.

4. An ambulance stretcher support for an ambulance having a floor with a top floor surface, comprising:

a stretcher leg receiving member adapted to releasably receive an ambulance stretcher leg;

a base configured to be mounted to the ambulance floor and to mount the stretcher leg receiving member for movement between a position substantially coplanar with the top floor surface, and a position below the top floor surface;

a vibration reduction device mounted between the base and the stretcher leg receiving member;

wherein the vibration reduction device is comprised of at least three coil springs mounted between the stretcher leg receiving member and the base;

wherein the at least three coil springs are spaced substantially equiangularly about a central axis; and wherein a stretcher leg can be releasably supported on the stretcher leg receiving member and the vibration reduction device will reduce transfer of vibration from the ambulance floor to the ambulance stretcher.

5. An ambulance stretcher support for an ambulance having a floor with a top floor surface, comprising:

a stretcher leg receiving member adapted to releasably receive an ambulance stretcher leg;

a base configured to be mounted to the ambulance floor and to mount the stretcher leg receiving member for movement between a position substantially coplanar with the top floor surface, and a position below the top floor surface;

a vibration reduction device mounted between the base and the stretcher leg receiving member;

wherein the stretcher leg receiving member is slidably mounted to the base, and the ambulance stretcher support further comprises an "O"-ring seal mounted between the stretcher leg receiving member and the base; and wherein a stretcher leg can be releasably supported on the stretcher leg receiving member and the vibration reduction device will reduce transfer of vibration from the ambulance floor to the ambulance stretcher.

6. The ambulance stretcher support of claim 1 wherein the vibration reduction device is comprised of at least three, and no more than nine, springs mounted between the stretcher leg receiving member and the base.

7. The ambulance stretcher support of claim 1, wherein the stretcher leg receiving member is movable with respect to the base along an axis, and wherein the base includes a thickness dimension along the axis that is no greater than approximately one inch.

8. The ambulance stretcher support of claim 1, wherein the stretcher leg receiving member is releasably mounted to the base, and the vibration reduction device comprises a plurality of springs releasably mounted between the base and stretcher leg receiving member such that said springs can be alternatively removed from or added between the stretcher leg receiving member and base.

9. The ambulance stretcher support of claim 1, wherein the vibration reduction device is limited to travel of not more than approximately 0.75 inch.

10. An ambulance stretcher support for an ambulance having a floor with a top floor surface, comprising:

a stretcher leg receiving member adapted to releasably receive an ambulance stretcher leg;

a base configured to be mounted to the ambulance floor and to mount the stretcher leg receiving member for movement between a position substantially coplanar with the top floor surface, and a position below the top floor surface;

wherein the base includes an ambulance floor mounting flange and an annular wall extending along an axis from the flange and defining a vibration reduction device receiving chamber;

a vibration reduction device mounted between the base and the stretcher leg receiving member; and wherein a stretcher leg can be releasably supported on the stretcher leg receiving member and the vibration reduction device will reduce transfer of vibration from the ambulance floor to the ambulance stretcher.

11. The ambulance stretcher support of claim 1, wherein the vibration reduction device is comprised of a plurality of coil springs, and wherein the stretcher leg receiving member includes spring-locating bosses positioned about the stretcher leg receiving member.

12. The ambulance stretcher support of claim 1, and wherein the vibration reduction device is comprised of a plurality of coil springs, and wherein the stretcher leg receiving member includes spring-locating bosses positioned about a central axis to receive and angularly space the coil springs at substantially equal angles about the central axis.

* * * * *